(12) United States Patent
Nguyen et al.

(10) Patent No.: US 9,137,202 B2
(45) Date of Patent: Sep. 15, 2015

(54) SYSTEM AND METHOD FOR DYNAMICALLY ADAPTING NETWORK DELIVERY MODES OF CONTENT

(75) Inventors: Han Q. Nguyen, Marlboro, NJ (US); Sunil Maloo, Edison, NJ (US); Douglas M. Nortz, Red Bank, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 982 days.

(21) Appl. No.: 13/156,849

(22) Filed: Jun. 9, 2011

(65) Prior Publication Data

US 2012/0317235 A1 Dec. 13, 2012

(51) Int. Cl.
| | | |
|---|---|---|
| G06F 15/16 | (2006.01) |
| H04L 29/12 | (2006.01) |
| H04L 12/18 | (2006.01) |
| H04L 12/801 | (2013.01) |
| H04N 21/24 | (2011.01) |
| H04N 21/262 | (2011.01) |
| H04N 21/63 | (2011.01) |
| H04N 21/6375 | (2011.01) |
| H04N 21/6402 | (2011.01) |
| H04N 21/6405 | (2011.01) |
| H04N 21/6408 | (2011.01) |
| H04N 21/643 | (2011.01) |
| H04N 21/84 | (2011.01) |

(52) U.S. Cl.
CPC .............. *H04L 61/609* (2013.01); *H04L 12/18* (2013.01); *H04L 47/15* (2013.01); *H04L 61/2069* (2013.01); *H04N 21/2408* (2013.01); *H04N 21/26291* (2013.01); *H04N 21/632* (2013.01); *H04N 21/6375* (2013.01); *H04N 21/6402* (2013.01); *H04N 21/6405* (2013.01); *H04N 21/6408* (2013.01); *H04N 21/64322* (2013.01); *H04N 21/84* (2013.01); *H04L 47/29* (2013.01)

(58) Field of Classification Search
None
See application file for complete search history.

(56) References Cited

U.S. PATENT DOCUMENTS

| | | | |
|---|---|---|---|
| 5,790,548 | A | 8/1998 | Sistanizadeh et al. |
| 6,088,443 | A | 7/2000 | Darland et al. |
| 6,633,765 | B1 | 10/2003 | Maggenti |
| 7,092,389 | B2 | 8/2006 | Chase et al. |
| 7,120,150 | B2 | 10/2006 | Chase et al. |
| 7,130,393 | B2 | 10/2006 | Hall et al. |
| 7,313,605 | B2 | 12/2007 | Iloglu et al. |
| 7,447,151 | B2 | 11/2008 | McDysan |
| 7,467,227 | B1 | 12/2008 | Nguyen et al. |
| 7,706,401 | B2 | 4/2010 | Bae et al. |

(Continued)

*Primary Examiner* — Melvin H Pollack
*Assistant Examiner* — Oluwatosin Gidado
(74) *Attorney, Agent, or Firm* — Akerman LLP; Michael K. Dixon; Roy P. Zachariah

(57) ABSTRACT

A content distribution network includes a first server in communication with an anycast server that provides content via a unicast signal, and with a multicast server that provides the content via a multicast signal. The first server is configured to receive a list of source addresses associated with the content, and to provide a metadata file including an anycast Internet protocol address of the anycast server from the list of source addresses as an Internet protocol address of the content in response to a first request for the content. When the number of client devices requesting the content exceeds a first threshold, the first server receives an updated list of sources including a multicast Internet protocol address of a multicast server, and provides the multicast Internet protocol address of the multicast server as the Internet protocol address of the content in the metadata file.

19 Claims, 9 Drawing Sheets

(56) References Cited

U.S. PATENT DOCUMENTS

| | | | |
|---|---|---|---|
| 7,769,006 B1 | 8/2010 | Chase et al. | |
| 7,916,735 B2 | 3/2011 | Mulligan et al. | |
| 7,920,549 B2 | 4/2011 | Alt et al. | |
| 7,983,254 B2 | 7/2011 | Alt et al. | |
| 8,028,082 B2 | 9/2011 | Hooda et al. | |
| 8,040,896 B2 | 10/2011 | Nguyen et al. | |
| 8,081,631 B1 | 12/2011 | Chase et al. | |
| 8,089,871 B2 | 1/2012 | Iloglu et al. | |
| 8,184,641 B2 | 5/2012 | Alt et al. | |
| 8,325,706 B2 | 12/2012 | Pacella | |
| 8,351,435 B2 | 1/2013 | Mulligan et al. | |
| 8,407,323 B2 | 3/2013 | Flavel et al. | |
| 8,411,667 B2 | 4/2013 | Scholl et al. | |
| 8,417,938 B1 | 4/2013 | Considine et al. | |
| 8,484,355 B1 | 7/2013 | Lochhead et al. | |
| 8,498,654 B2 | 7/2013 | Wyk et al. | |
| 8,537,854 B2 | 9/2013 | Bae et al. | |
| 8,571,011 B2 | 10/2013 | Alt et al. | |
| 8,601,091 B2 | 12/2013 | Venouss et al. | |
| 8,670,446 B2 | 3/2014 | Chase et al. | |
| 8,695,059 B2 | 4/2014 | Kopti | |
| 8,699,499 B2 | 4/2014 | Mulligan et al. | |
| 8,713,628 B2 | 4/2014 | Kopti | |
| 8,776,256 B2 | 7/2014 | Nguyen et al. | |
| 8,806,606 B2 | 8/2014 | Ahmad et al. | |
| 8,819,195 B2 | 8/2014 | Flavel et al. | |
| 8,819,284 B2 | 8/2014 | Nguyen et al. | |
| 2002/0143976 A1* | 10/2002 | Barker et al. | 709/231 |
| 2006/0029035 A1 | 2/2006 | Chase et al. | |
| 2006/0047845 A1* | 3/2006 | Whited et al. | 709/231 |
| 2006/0206606 A1 | 9/2006 | Iloglu et al. | |
| 2006/0239290 A1 | 10/2006 | Lin et al. | |
| 2007/0101012 A1 | 5/2007 | Li et al. | |
| 2007/0104151 A1 | 5/2007 | Papasakellariou et al. | |
| 2007/0168523 A1* | 7/2007 | Jiang et al. | 709/228 |
| 2007/0195771 A1 | 8/2007 | Lu | |
| 2008/0065783 A1 | 3/2008 | Iloglu et al. | |
| 2008/0267210 A1 | 10/2008 | Sidana | |
| 2008/0279222 A1* | 11/2008 | Fuller et al. | 370/501 |
| 2009/0022064 A1* | 1/2009 | Oron et al. | 370/253 |
| 2009/0168752 A1 | 7/2009 | Segal | |
| 2009/0168795 A1 | 7/2009 | Segel | |
| 2009/0248886 A1* | 10/2009 | Tan et al. | 709/231 |
| 2009/0293095 A1 | 11/2009 | Karaoguz et al. | |
| 2010/0172282 A1 | 7/2010 | Zhang et al. | |
| 2010/0287151 A1* | 11/2010 | Mustonen | 707/707 |
| 2012/0185298 A1* | 7/2012 | Abboa-Offei | 705/7.31 |
| 2013/0054426 A1 | 2/2013 | Rowland et al. | |
| 2013/0077470 A1 | 3/2013 | Mulligan et al. | |
| 2013/0182710 A1 | 7/2013 | Scholl et al. | |
| 2013/0227672 A1 | 8/2013 | Ogg et al. | |
| 2013/0247082 A1* | 9/2013 | Wang et al. | 725/14 |
| 2013/0276090 A1 | 10/2013 | Kopti | |
| 2014/0044132 A1 | 2/2014 | Chase et al. | |
| 2014/0181966 A1 | 6/2014 | Carney et al. | |
| 2014/0223434 A1 | 8/2014 | Mulligan et al. | |
| 2014/0250240 A1 | 9/2014 | Schnell et al. | |
| 2014/0289813 A1 | 9/2014 | Nguyen et al. | |
| 2014/0310603 A1 | 10/2014 | Flavel et al. | |

* cited by examiner

SYSTEM AND METHOD FOR DYNAMICALLY ADAPTING NETWORK DELIVERY MODES OF CONTENT

FIELD OF THE DISCLOSURE

The present disclosure generally relates to communications networks, and more particularly relates to content delivery networks.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to a cache server situated closer to the client issuing the request. CDNs either co-locate cache servers within Internet Service Providers or deploy them within their own separate networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

Figure 1:
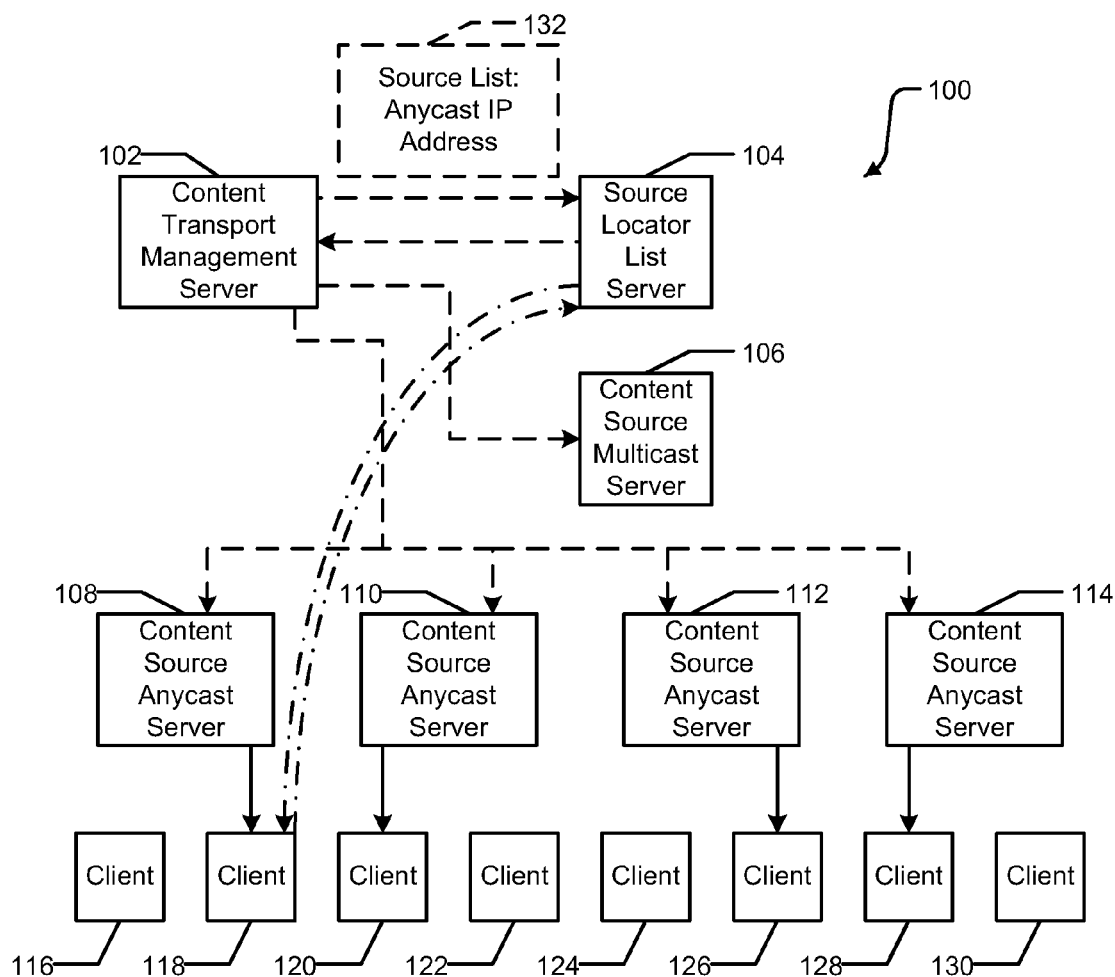
FIGS. 1-4 are block diagrams illustrating a content distribution network in accordance with an embodiment of the present disclosure.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

FIGS. 1-4 illustrate a content distribution network (CDN) 100 that can be used in conjunction with a communications network such as the Internet. The CDN 100 can include a content transport management (CTM) server 102, a source locator list (SLL) server 104, a content source multicast server 106, content source anycast servers 108, 110, 112, and 114, and client devices 116, 118, 120, 122, 124, 126, 128, and 130. The CDN 100 can provide content to the client devices 116-130 via multiple delivery modes, such as a unicast mode, a multicast mode, a peer-to-peer mode, and the like. The CTM server 102 is in communication with the SLL server 104, with the multicast server 106, and with the anycast servers 108-114. The SLL server 104 can communicate with the client devices 116-130.

The multicast server 106 can communicate with the client devices 116-130 to provide a multicast stream of content to the client devices. Similarly, each of the anycast servers 108-114 can communicate with the client devices 116-130 to provide a unicast stream of the content to the client devices. A single anycast IP address can be assigned to each of the anycast servers 108-114, such that the anycast server that is closest to a requesting client device can provide the unicast stream of content to that client device. The closest anycast server may be the anycast server having a shortest network distance, a lowest network cost, a lowest network latency, a highest link capacity, a lowest load, or any combination thereof.

The CTM server 102 can receive load information from the multicast server 106 and the anycast servers 108-114. The load information can include available bandwidth, bandwidth utilization, CPU utilization, memory utilization, number of requests being served, or the like. The multicast server 106 can advertise, such as through Border Gateway Protocol (BGP), a multicast IP address for the multicast server to the CTM server 102. Similarly, the anycast servers 108-114 can advertise a shared anycast address to the CTM server 102 via BGP. The CTM server 102 can provide either the multicast address, the anycast address, a local peer IP address, or any combination thereof as the source address for particular content and/or for error recovery to the client devices 116-130.

The multicast server 106 and the anycast servers 108-114 of the CDN 100 can provide the client devices 116-130 with different types of content, such as software files, video-on-demand files, music files, or the like. Each item of content can divided into a number of blocks. The blocks can be divided into equal sizes, and can be indexed with the order of the blocks within the content file. The structure and order of the blocks of the content file can be stored in a metadata file, which can include a file descriptor for the content file, a list of sources for the content file, and other information about the content file. The file descriptor can include file identification (ID), a number of blocks and the sequence of the blocks in the content file. The list of sources can include IP addresses for unicast sources, multicast sources, local peer sources, and the like.

During operation, the SLL server 104 can monitor current statistics for the content, such as a number of the client devices 116-130 that are receiving the content, a rate of requests for the content, and the like. The SLL server 104 can send the current statistics for the content to the CTM server 102, which in turn can create a source list 132 based on the current statistics for the content. For example, the SLL server 104 can indicate that the number of client devices 116-130 receiving the content is below a high threshold. The CTM server 102 can create the source list 132 with an anycast IP address, associated with the anycast servers 108-114, as a primary source address for the content. The anycast servers 108-114 can be unicast servers, such that each of the anycast servers can provide a different unicast address to the CTM-server 102 via BGP.

The CTM server 102 can provide the source list 132 to the SLL server 104, which in turn can include the source list 132 as part of the metadata file for the content. The SLL server 104 can then provide the metadata file associated with the content to a client device that is requesting the content. The SLL server 104 can dynamically update the metadata file, and can provide the updated metadata file to the client devices 116-130 so that the client devices can have a current list of sources for the content. The requesting client device, such as client device 118, can utilize the metadata file to determine that the anycast IP address is the source address for the content.

The client device 118 can then connect to the anycast server 108-114 that is nearest to the client device based on the anycast IP address in the metadata file received from the SLL server 104. The metadata file can have a time-to-live (TTL) period associated with it, so that the source address for the content can be continually updated. When the TTL period has expired, the client device 118 can request the metadata file from the SLL server 104 again.

When the source list 132 in the metadata file only includes the anycast IP address, the anycast servers 108-114 can be the primary source address for the content, and can be a source address for error recovery. In another embodiment, unicast addresses for each of the anycast servers 108-114 can be listed as the primary sources for the content in the metadata file. The anycast servers 108-114 can provide the client devices 116-130 with the entire content file via a unicast stream containing individual blocks of the content file from the anycast server nearest to the requesting client device. The blocks of the content file can be received in any order, and the client device 118 can use the sequence of the blocks in the metadata file to reconstruct the content file. While reconstructing the content file, the client device 118 may detect an error in one or more blocks of the content file, and can then request those blocks from the anycast server 110 again. The anycast can then deliver the requested block or blocks to the client device 118.

Figure 2:
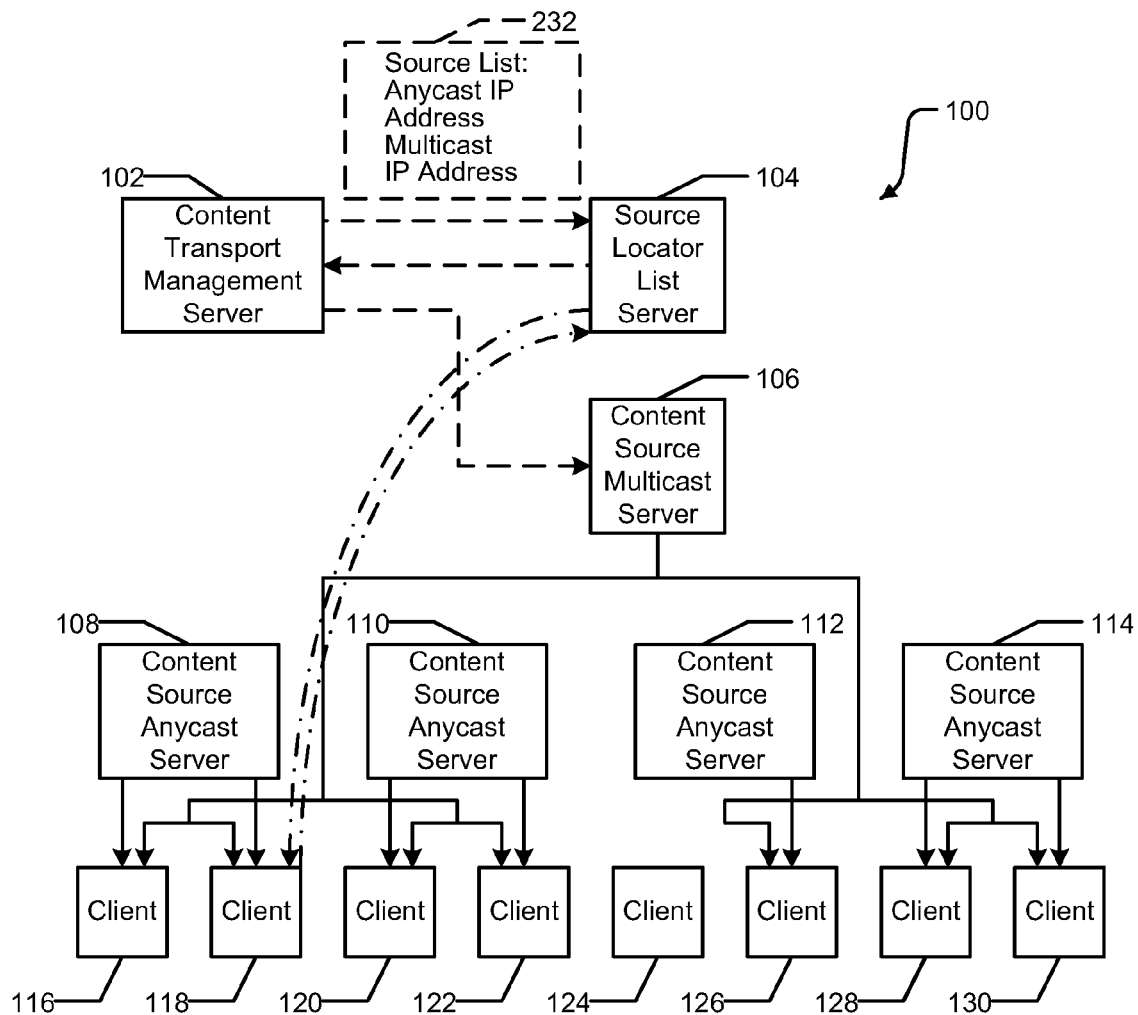

Referring now to FIG. 2, the CTM server 102 can continue to receive the number of client devices requesting the content file from the SLL server 104. When the CTM server 102 detects that the number of client devices receiving the content has exceeded the high threshold, the CTM server can send a signal to enable the multicast server 106. The CTM server 102 can then provide the SLL server 104 with an updated source list 232, which includes both the anycast IP address and the multicast IP address. The updated source list 232 can indicate that the anycast IP address can be the source address for the first few blocks of the content file, that the multicast IP address can be the primary source address for the remainder of the content file, and that the anycast IP address can be the source address for error recovery. The SLL server 104 can provide the updated source list to the client devices 116-130 as part of the metadata file.

The client device 126 can utilize the updated source list 232 to determine the source IP addresses for the content. That is, the client device 126 can connect to an anycast server having the anycast IP address that is nearest to the client device, such as anycast server 112, to receive the first few blocks of the content. The anycast server 112 can then provide the client device 126 with a unicast signal containing blocks of the content. The anycast servers 108-114 can be used to provide the first few block, because the anycast servers can generally provide faster initial access to the blocks of the content than the multicast server 106. The client device 126 can determine that the multicast IP address should be used after the client device has received a few of the blocks of the content based on the updated source list 232. The client device 126 can then connect to the multicast server 106, which in turn can provide a multicast signal containing blocks of the content file to the client device. When the client device 126 begins to receive the multicast signal, the client device can stop receiving the unicast signal from the anycast server 112.

While the client device 126 is receiving blocks of content file, the client device can determine whether one or more of the blocks of content have an error. If a block is detected as having an error, the client device 126 can connect to the anycast server 112 to receive that block of the content again. In another embodiment, there can be multiple multicast servers, such that each of the multicast servers can provide redundancy for the other multicast servers for error recovery instead of the anycast servers 108-114.

Figure 3:
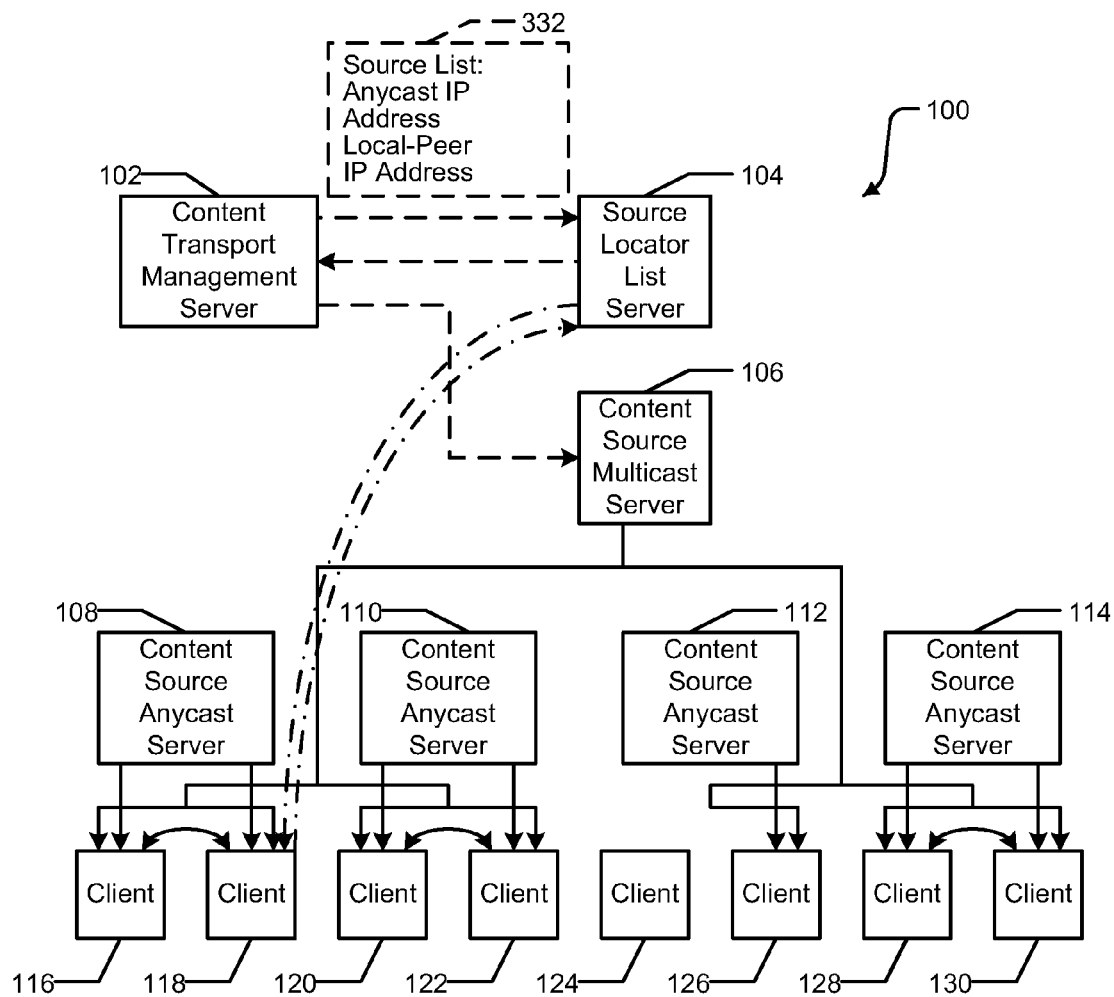

Now referring to FIG. 3, each time one of the client devices 116-130 requests the content, the SLL server 104 can detect an IP address and a zone of the CDN 100 associated with that client device. The SLL server 104 can then provide the IP address and the zone of the CDN 100 for that client device to the CTM server 102, which in turn can store this information as a list of IP addresses of local peer sources for a zone of the network 100. The CTM server 102 can create an updated source list 332, which can include the anycast IP address, the multicast IP address, and local peer IP addresses each as different source addresses. The updated source list 332 can indicate that the anycast IP address should be used for the first few blocks of the content, that the multicast IP address should be used for the remainder of the content, and the local peer IP addresses in the zone of the CDN 100 associated with the client device should be used for error recovery.

The CTM server 102 can then return the updated source list 332 to the SLL server 104, which in turn can provide the updated source list to the client devices 116-130. A client device, such as client device 118, can then utilize the updated source list 332 to determine source addresses for the content. That is, the client device 118 can connect to an anycast server, such as anycast server 108, having the anycast IP address that is nearest to the client device to receive the first few blocks of the content. The anycast server 108 can then provide the client device 118 with a unicast signal containing blocks of the content.

The client device 118 can then connect to the multicast server 106, which in turn can provide a multicast signal containing the blocks of the content to the client device. When the client device 118 begins to receive the multicast signal, the client device can stop receiving the unicast signal from the anycast server 108. If the client device 118 determines that one or more of the blocks of content have an error while the content file is being received, the client device can connect to the client device 116 associated with the local peer IP address in the updated source list 332 to receive those blocks of the content. The client device 116 can then provide the client device 118 with the requested blocks of content via a peer-to-peer connection.

Figure 4:
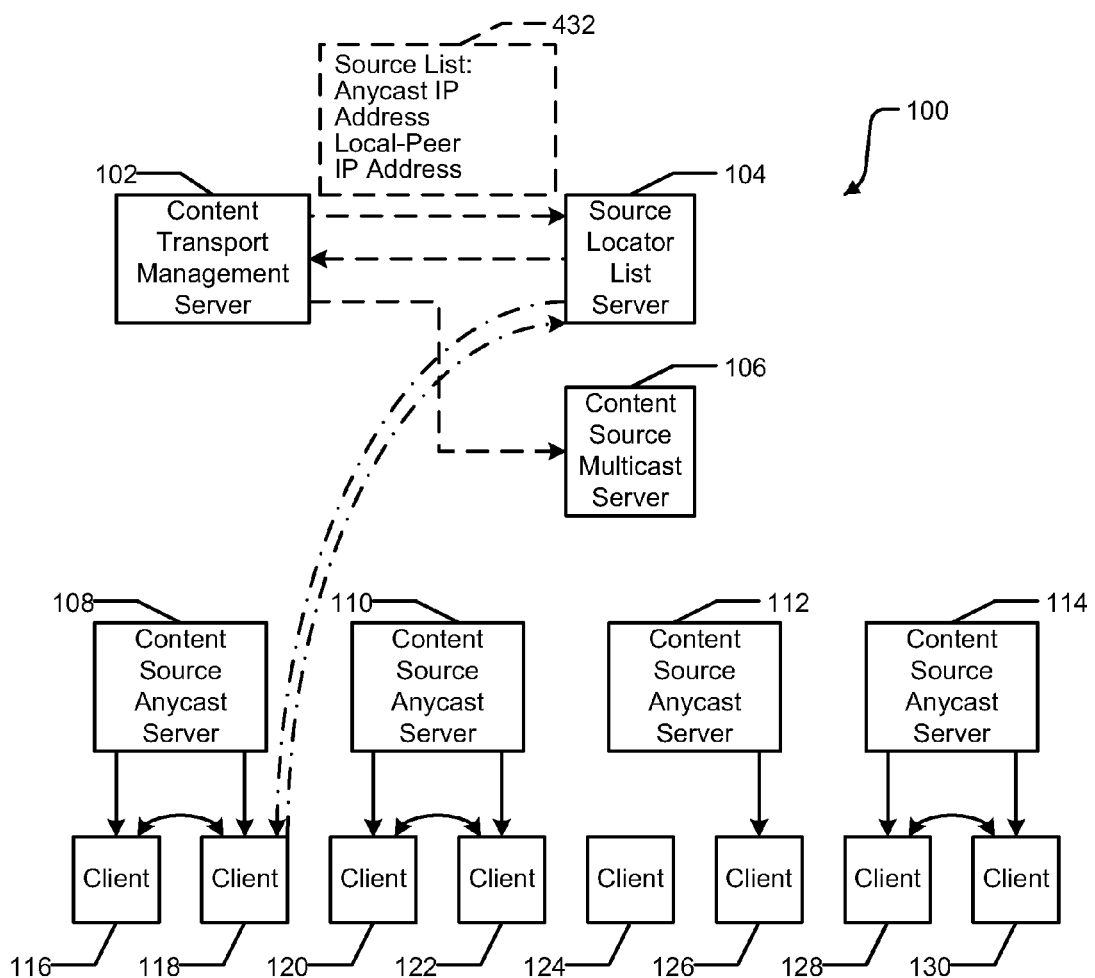

Referring now to FIG. 4, when the CTM server 102 detects that the number of client devices receiving the content has dropped below a low threshold, the CTM server can send a signal to disable the multicast server 106. The CTM server 102 can then provide the SLL server 104 with an updated source list 432 to include remove the multicast IP address, such that only the anycast IP address and local peer IP addresses are listed as source addresses for the content. The updated source list 432 can indicate that the anycast IP address should be used for receiving all of the content, and that the local peer IP address in the zone of the CDN 100 associated with the client device should be used for error recovery. The SLL server 104 can then provide the updated source list to the client devices 116-130.

The client device 130 can then utilize the updated source list 432 to determine the source IP addresses for the content. That is, the client device 130 can connect to an anycast server, such as anycast server 114, having the anycast IP address that is nearest to the client device to receive the content. The anycast server 114 can then provide the client device 130 with a unicast signal containing blocks of the content. If the client device 130 determines that one or more of the blocks of content have an error, the client device can connect to a local peer, such as client device 128, having an IP address listed in the updated source list 432 to receive those blocks of data again. The client device 128 can then provide the client device 130 with the requested blocks of content via a peer-to-peer connection.

While the receiving of the blocks of content has only been described with respect to particular client devices, it should be understood that each of the client devices 116-130 can receive the blocks of content in a substantially similar modes using the metadata file received from the SLL server 104. In another embodiment, the anycast servers 114 can provide all of a content file and error recovery to the client device 116-130 via a unicast stream when access control features have been set for the content file. In this situation, the client device 120 can request the content via the anycast IP address, and can provide the anycast server 114 with authentication information associated with the content. The anycast server 114 can verify the authentication information and then provide the content to the client device 120 via the unicast signal.

Figure 5:
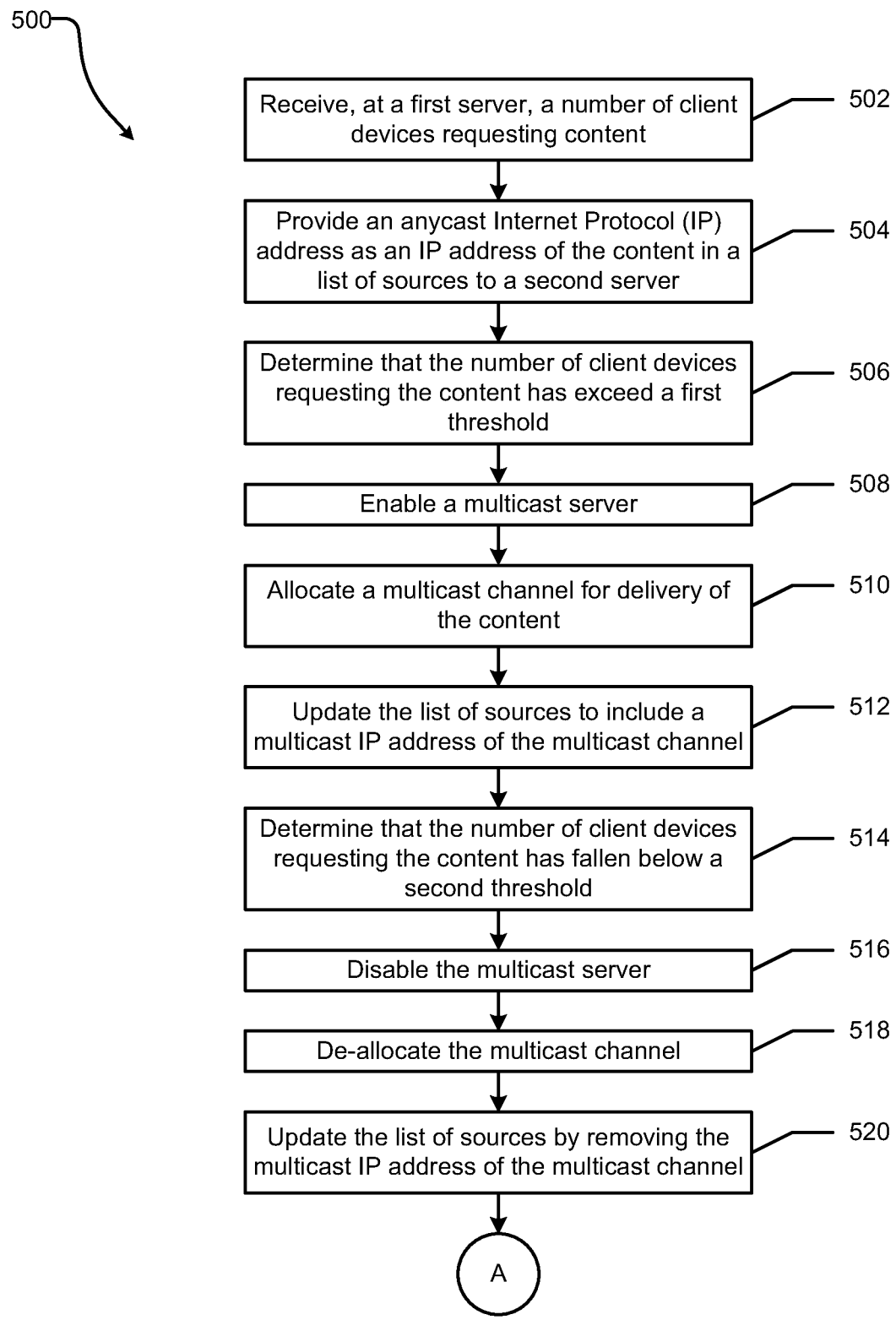
FIGS. 5-7 are flow diagrams illustrating a method for providing content in the content distribution network.
Figure 6:
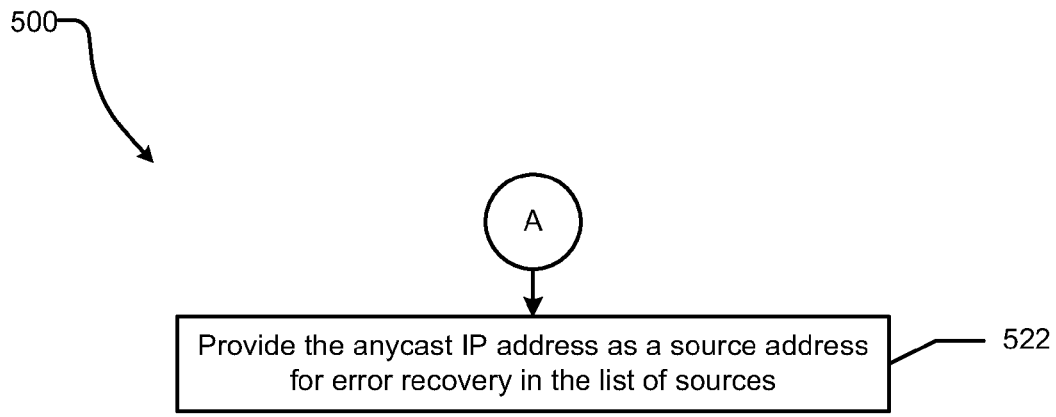
Figure 7:
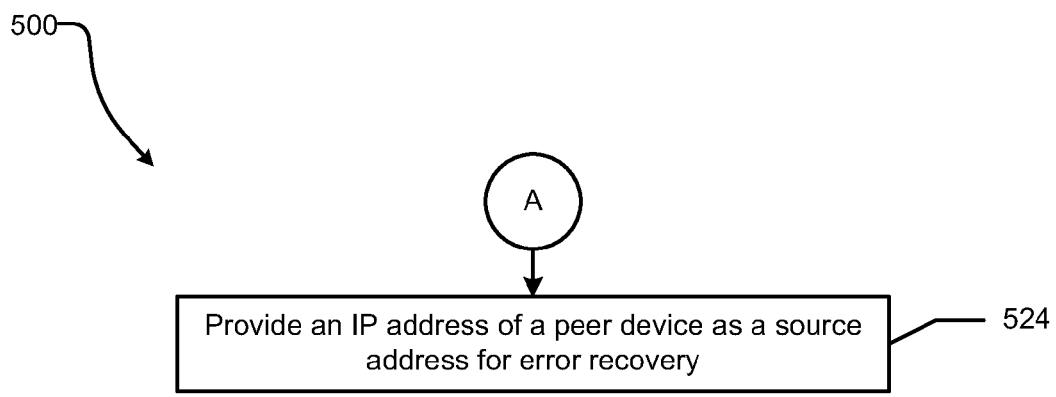

FIGS. 5-7 illustrate a method 500 for providing content in the content distribution network system. At block 502, a number of client devices requesting content is received at a first server. The request can be received from a client device, such as a personal computer, a personal digital assistant, a smart cellular telephone, and the like. The first server can be the CTM server discussed above. An anycast IP address is provided as an IP address of the content at block 504. The content can be delivered via a unicast signal from an anycast server having the anycast IP address. The anycast server that delivers the content can be a cache server that is nearest in the network to the client device requesting the content. In another embodiment, a unicast IP address can be provided instead of the anycast IP address as the IP address of the content. At block 506, a determination is made that the number of client device requesting the content has exceeded a first threshold. A multicast server is enabled when the number of client devices requesting has exceeded the first threshold at block 508.

At block 510, a multicast channel of the multicast server is allocated for delivery of the content. A list of sources is updated to include a multicast IP address of the multicast channel at block 512. The multicast IP address can be set as a primary source address of the content. The multicast address of the multicast channel can provided as the address of the content. At block 514, a determination is made that the number of client devices requesting the content has fallen below a second threshold. The multicast server is disabled when the number of client devices requesting the content has fallen below the second threshold at block 516. The multicast channel is de-allocated at block 518. At block 520, the list of sources is updated by removing the multicast IP address of the multicast channel.

Referring now to FIG. 6, in one embodiment the anycast IP address is provided as a source address for error recovery at block 522.

Referring now to FIG. 7, in another embodiment an IP address of a peer device is provided as a source address for error recovery at block 524.

Figure 8:
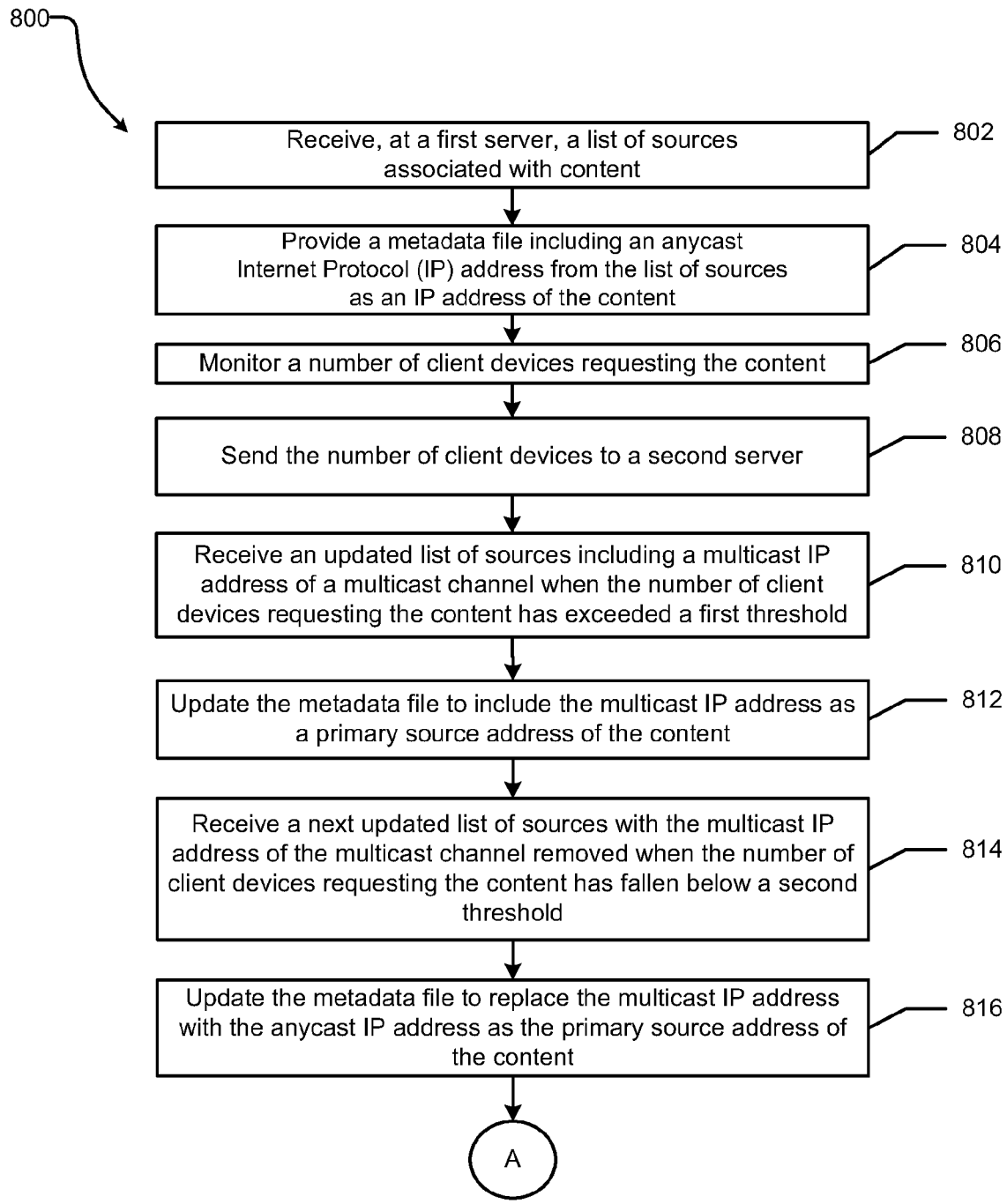
FIGS. 8-10 are flow diagrams illustrating a method for controlling content sources in the content distribution network.
Figure 9:
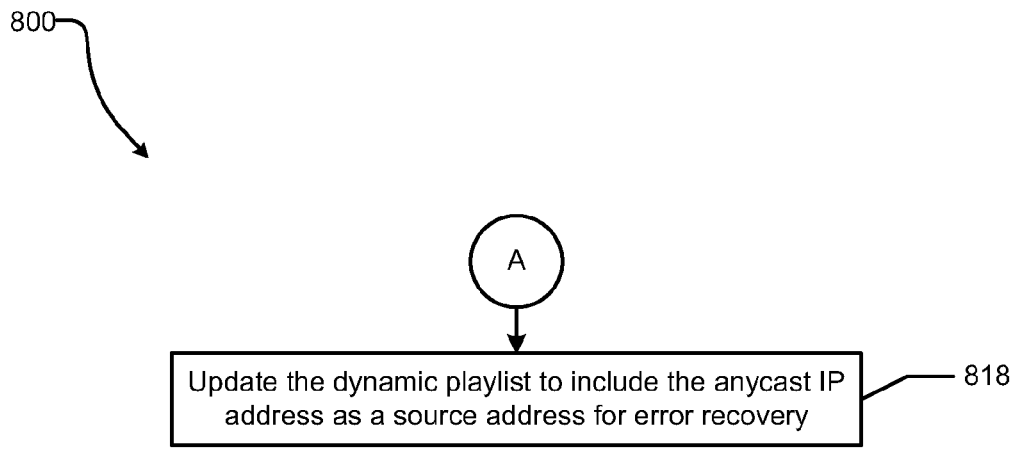
Figure 10:
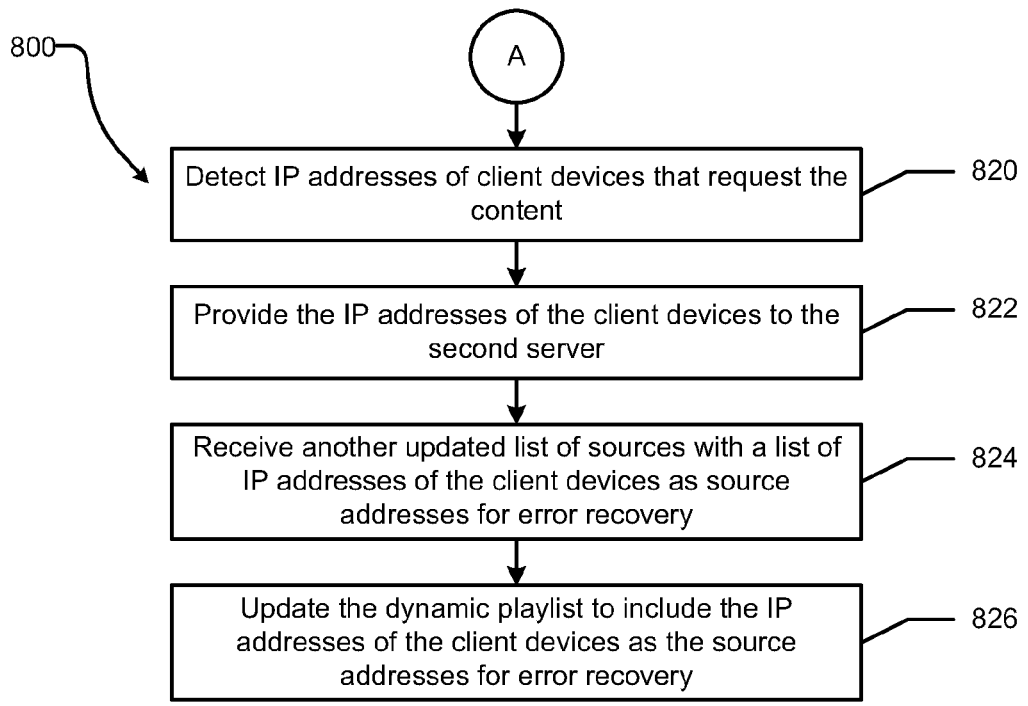

FIGS. 8-10 are a flow diagram illustrating a method for controlling content sources in the content distribution network system. At block 802, a list of sources associated with content is received at a first server. A metadata file including an anycast IP address from the list of sources is provided as an IP address of the content at block 804. At block 806, a number of client devices requesting the content is monitored. At block 808, the number of client devices requesting the content is sent to a second server.

At block 810, an updated list of sources including a multicast IP address of the multicast channel is received when the number of client devices requesting the content has exceeded a first threshold. The metadata file is updated to include the multicast IP address of the multicast channel as a primary source of the content at block 812. At block 814, an updated list of sources with the multicast IP address of the multicast channel removed is received when the number of client devices requesting the content has fallen below a second threshold. The metadata file is updated to replace the multicast IP address of the multicast channel with the anycast IP address as the primary source address of the content at block 816.

Referring now to FIG. 9, in one embodiment the metadata file is updated to include the anycast IP address as a source address for error recovery at block 818.

Referring now to FIG. 10, IP addresses of client devices that request the content are detected at block 820. At block 822, the IP addresses of the client devices are provided to the second server. Another updated list of sources with a list of the IP addresses of the client devices as source address for error recovery is received at block 824. At block 826, the metadata file is updated to include the IP addresses of the client devices as the source address for error recovery.

Figure 11:
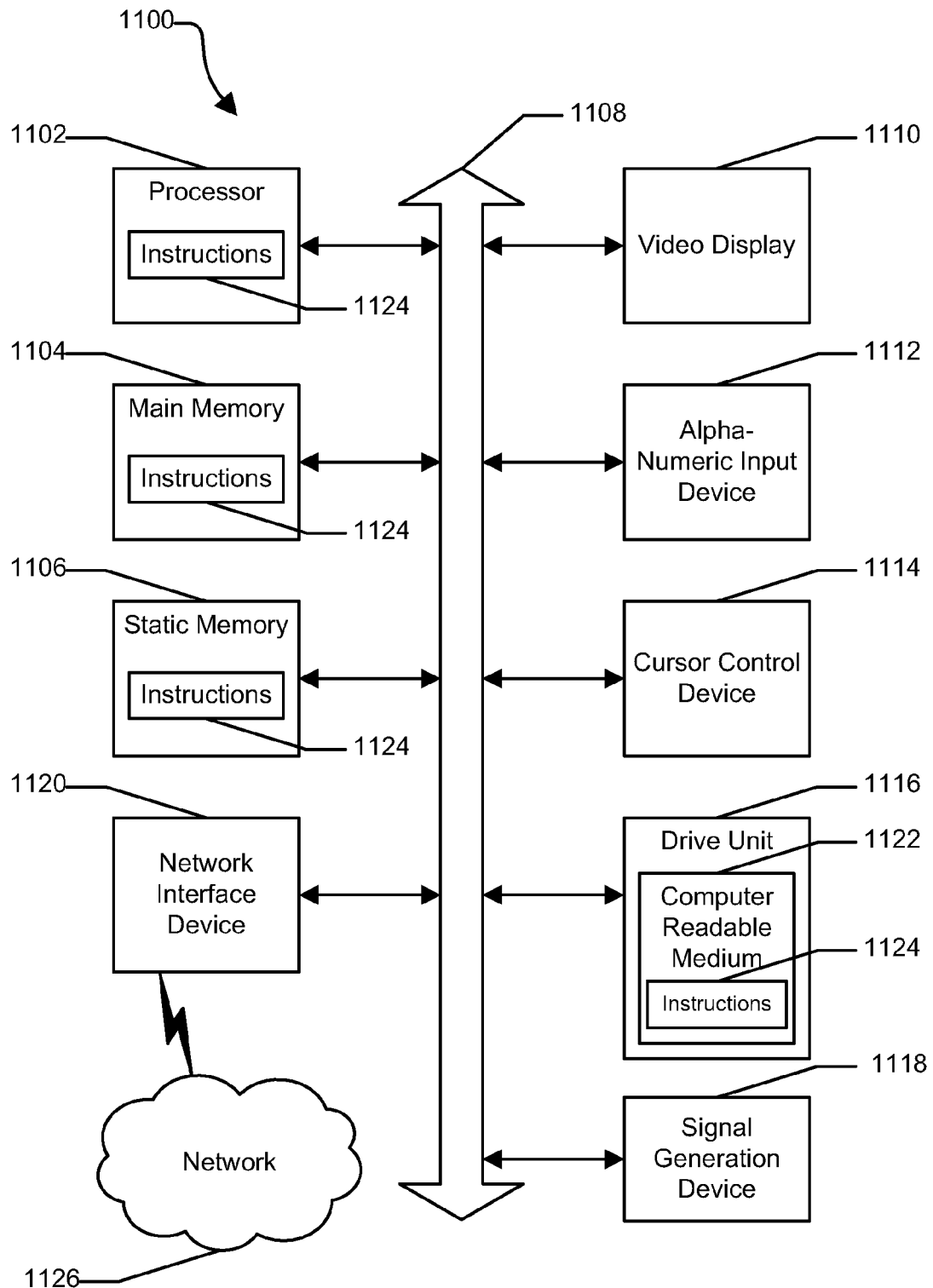
FIG. 11 is an illustrative embodiment of a general computer system.

FIG. 11 shows an illustrative embodiment of a general computer system 1100. The computer system 1100 can include a set of instructions that can be executed to cause the computer system to perform any one or more of the methods or computer based functions disclosed herein. The computer system 1100 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1100 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1100 can be implemented using electronic devices that provide voice, video or data communication. Further, while a single computer system 1100 is illustrated, the term "system" shall also be taken to include any collection of systems or sub-systems that individually or jointly execute a set, or multiple sets, of instructions to perform one or more computer functions.

The computer system 1100 may include a processor 1102, such as a central processing unit (CPU), a graphics processing unit (GPU), or both. Moreover, the computer system 1100 can include a main memory 1104 and a static memory 1106 that can communicate with each other via a bus 1108. As shown, the computer system 1100 may further include a video display unit 1110 such as a liquid crystal display (LCD), an organic light emitting diode (OLED), a flat panel display, a solid state display, or a cathode ray tube (CRT). Additionally, the computer system 1100 may include an input device 1112 such as a keyboard, and a cursor control device 1114 such as a mouse. The computer system 1100 can also include a disk drive unit 1116, a signal generation device 1118 such as a speaker or remote control, and a network interface device 1120 to communicate with a network 1126. In a particular embodiment, the disk drive unit 1116 may include a computer-readable medium 1122 in which one or more sets of instructions 1124, such as software, can be embedded. The computer-readable medium can be a non-transitory computer readable medium, such as a hard disk drive, a flash memory, a read-only memory, a compact disk, a digital versatile disk, a cache, a random-access memory, and the like. Further, the instructions 1124 may embody one or more of the methods or logic as described herein. In a particular embodiment, the instructions 1124 may reside completely, or at least partially, within the main memory 1104, the static memory 1106, and/or within the processor 1102 during execution by the computer system 1100. The main memory 1104 and the processor 1102 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A content distribution network comprising:
   a first server in communication with an anycast server that provides content via a unicast signal, and in communication with a multicast server that provides the content via a multicast signal, wherein the first server executes instructions to perform operations, the operations comprising:
   receiving a list of source addresses associated with the content;
   providing a metadata file including an anycast internet protocol address of the anycast server from the list of source addresses as an internet protocol address of the content in response to a first request for the content;
   monitoring a number of client devices requesting the content and a rate of requests for the content;
   when the number of client devices requesting the content exceeds a first threshold; receiving an updated list of sources including a multicast internet protocol address of a multicast server, providing the anycast internet protocol address of the anycast server as the internet protocol address of a first set of blocks of the content in the metadata file, and providing the multicast internet protocol address of the multicast server as the internet protocol address of a remaining set of blocks of the content in the metadata file;
   receiving a request for an updated metadata file when a time-to-live period of the metadata file has expired; and
   providing the updated metadata file including the updated list of sources after the time-to-live period of the metadata file has expired.

2. The content distribution network of claim 1, wherein the operations further comprise:
   when the number of client devices requesting the content has fallen below the second threshold, disabling the multicast server, receiving a next updated list of sources with the multicast internet protocol address of the multicast server being removed from the next updated list of sources, and providing the metadata file with the next updated list of sources in response to a second request.

3. The content distribution network of claim 1, further comprising:
   a second server in communication with the first server, wherein the second server provides the list of sources and the updated list of sources to the first server.

4. The content distribution network of claim 3, wherein the second server includes the anycast internet protocol address as a source address for error recovery in the updated list of sources.

5. The content distribution network of claim 3, wherein the second server allocates a multicast channel of the multicast server for delivery of the content when the number of client devices requesting the content has exceeded the first threshold, and de-allocates the multicast channel for delivery of the content when the number of client devices requesting the content has fallen below the second threshold.

6. The content distribution network of claim 3, wherein the second server includes an internet protocol address of a peer device as a source address for error recovery in the updated list of sources.

7. The content distribution network of claim 1, wherein operations further comprise including the anycast internet protocol address as the source address for error recovery in the metadata file.

8. The content distribution network of claim 1, wherein the operations further comprise detecting internet protocol addresses of client devices that request the content.

9. The content distribution network of claim 1, wherein the operations further comprise including the internet protocol address of the peer device as the source address for error recovery in the metadata file.

10. The content distribution network of claim 1, wherein the metadata file is required to be updated after a specific amount of time.

11. A method comprising:
receiving, at a first server, a number of client devices requesting content;
monitoring the number of client devices requesting the content and a rate of requests for the content;
providing an anycast internet protocol address of an anycast server as an internet protocol address of the content in a list of sources to a second server, wherein the list of sources is provided as a metadata file for receiving the content;
determining that the number of client devices requesting the content exceeds a first threshold;
enabling a multicast server when the number of client devices requesting the content exceeds the first threshold;
allocating a multicast channel of the multicast server for delivery of the content in response to enabling the multicast server;
updating the list of sources to include a multicast internet protocol address of the multicast server providing the multicast channel, wherein, when the number of client devices requesting the content exceeds the first threshold, the metadata file indicates that the anycast internet protocol address of the anycast server is the internet protocol address of a first set of blocks of the content, and wherein, when the number of client devices exceeds the first threshold, the metadata file indicates that the multicast internet protocol address is the internet protocol address of a remaining set of blocks of the content;
determining that the number of client devices requesting the content has fallen below a second threshold;
disabling the multicast server when the number of client devices requesting the content has fallen below the second threshold;
de-allocating the multicast channel in response to disabling the multicast server; and
updating the list of sources by removing the multicast internet protocol address of the multicast server;
receiving a request for an updated metadata file when a time-to-live period of the metadata file has expired; and
providing the updated metadata file including an updated list of sources after the time-to-live period of the metadata file has expired.

12. The method of claim 11, wherein the metadata file is required to be updated after a specific amount of time.

13. The method of claim 11, further comprising:
providing the anycast internet protocol address of the anycast server as a source address for error recovery in the list of sources.

14. The method of claim 11, further comprising:
receiving an internet protocol address of a peer device that has requested the content; and
providing the internet protocol address of the peer device as a source address for error recovery in the list of sources.

15. A method comprising:
receiving, at a first server, a list of sources associated with content;
providing a metadata file including an anycast protocol address of an anycast server from the list of sources as an internet protocol address of the content;
sending a number of client devices requesting the content to a second server;
monitoring the number of client devices requesting the content and a rate of requests for the content;
receiving, from the second server, an updated list of sources including a multicast internet protocol address of a multicast server when the number of client devices requesting the content has exceeded the first threshold;
updating the metadata file to include the multicast internet protocol address of the multicast server as a primary source address of the content, wherein, when the number of client devices requesting the content exceeds the first threshold, the metadata file indicates that the anycast internet protocol address of the anycast server is the internet protocol address of a first set of blocks of the content, and wherein, when the number of client devices exceeds the first threshold, the metadata file indicates that the multicast internet protocol address is the internet protocol address of a remaining set of blocks of the content;
receiving a next updated list of sources when the number of client devices requesting the content has fallen below a second threshold, wherein the multicast internet protocol address of the multicast server is removed from the next updated list of sources;
updating the metadata file to replace the multicast internet protocol address with the anycast internet protocol address of the anycast server as the primary source address of the content;
receiving a request for an updated metadata file when a time-to-live period of the metadata file has expired; and
providing the updated metadata file including the next updated list of sources after the time-to-live period of the metadata file has expired.

16. The method of claim 15, wherein the metadata file is required to be updated after a specific amount of time.

17. The method of claim 15, further comprising:
updating the metadata file to include the anycast internet protocol address of the anycast server as a source address for error recovery.

18. The method of claim 15, further comprising:
detecting internet protocol addresses of client devices that request the content;
providing the internet protocol addresses of the client devices to the second server;
receiving another updated list of sources with the list of internet protocol addresses of the client devices as source addresses for error recovery; and
updating the metadata file to include the internet protocol addresses of the client devices as the source addresses for error recovery.

19. The method of claim 18, wherein the internet protocol address of the client devices are grouped based on a zone of a network that the client devices are located.

* * * * *